US009711010B2

(12) United States Patent
Nowak et al.

(10) Patent No.: US 9,711,010 B2

(45) Date of Patent: Jul. 18, 2017

(54) BAD BEAT INSURANCE

(71) Applicant: Zynga Inc., San Francisco, CA (US)

(72) Inventors: James Brett Nowak, San Francisco, CA (US); Shawn Carnes, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 153 days.

(21) Appl. No.: 14/636,720

(22) Filed: Mar. 3, 2015

(65) Prior Publication Data

US 2015/0179022 A1 Jun. 25, 2015

Related U.S. Application Data

(63) Continuation of application No. 13/436,446, filed on Mar. 30, 2012, now Pat. No. 8,974,279.

(60) Provisional application No. 61/606,814, filed on Mar. 5, 2012.

(51) Int. Cl.
*A63F 13/00* (2014.01)
*G07F 17/32* (2006.01)

(52) U.S. Cl.
CPC ...... *G07F 17/3293* (2013.01); *G07F 17/3244* (2013.01); *G07F 17/3262* (2013.01)

(58) Field of Classification Search
None
See application file for complete search history.

(56) References Cited

U.S. PATENT DOCUMENTS 6,869,362 B2 3/2005 Walker et al.
8,348,739 B2 * 1/2013 Bell .................... G07F 17/3276 273/292
8,974,279 B1 3/2015 Nowak et al.
2002/0019253 A1 * 2/2002 Reitzen .................. G07F 17/32 463/16
2006/0223605 A1 * 10/2006 Pullman .................... A63F 1/00 463/16
2007/0066387 A1 * 3/2007 Matsuno ................. G07F 17/32 463/25
2008/0088087 A1 * 4/2008 Weitzman ................. A63F 1/00 273/292
2009/0121434 A1 * 5/2009 Baerlocher ......... G07F 17/3276 273/292
2009/0124316 A1 * 5/2009 Baerlocher ......... G07F 17/3227 463/13

(Continued)

FOREIGN PATENT DOCUMENTS

WO WO-2012145093 A2 10/2012

OTHER PUBLICATIONS

"U.S. Appl. No. 13/436,446 , Response filed Oct. 15, 2013 to Non Final Office Action mailed Jun. 12, 2013", 11 pgs.

(Continued)

*Primary Examiner* — Sunit Pandya
(74) *Attorney, Agent, or Firm* — Schwegman Lundberg & Woessner, P.A.

(57) ABSTRACT

In various embodiments, a system and a method of implementing bad beat insurance are disclosed. After a stage of a portion of a game is played, it is determined that a player is favored to win the portion of the game. After the portion of the game is completed, it is determined that the player has suffered a bad beat. The player is compensated at least partially for a loss that the player incurred as a consequence of suffering the bad beat.

17 Claims, 8 Drawing Sheets

500

(56) References Cited

U.S. PATENT DOCUMENTS

2011/0207522 A1* 8/2011 Girafi ...................... G07F 17/32
463/22

OTHER PUBLICATIONS

"U.S. Appl. No. 13/436,446, Final Office Action mailed Dec. 18, 2013", 9 pgs.
"U.S. Appl. No. 13/436,446, Non Final Office Action mailed Jun. 12, 2013", 10 pgs.
"U.S. Appl. No. 13/436,446, Non Final Office Action mailed Aug. 22, 2014", 6 pgs.
"U.S. Appl. No. 13/436,446, Notice of Allowance mailed Jan. 9, 2015", 9 pgs.
"U.S. Appl. No. 13/436,446, Notice of Allowance mailed Jul. 8, 2014", 9 pgs.
"U.S. Appl. No. 13/436,446, Response filed Nov. 24, 2014 to Non Final Office Action mailed Aug. 22, 2014", 17 pgs.
"U.S. Appl. No. 13/436,446, Supplemental Notice of Allowability mailed Jan. 23, 2015", 6 pgs.

* cited by examiner

FIG. 5
CHECK
FOLD
RAISE:
$800
All-in
Hand: High Card Q
Poker Buddies (2)

500

BAD BEAT INSURANCE

CROSS-REFERENCE TO RELATED APPLICATIONS

This application is a continuation of U.S. patent application Ser. No. 13/436,446, filed on Mar. 30, 2012, which claims the benefit of U.S. Provisional Application No. 61/606,814, filed Mar. 5, 2012, the benefit of priority of each of which is claimed, and each of which is incorporated herein by reference in its entirety.

TECHNICAL FIELD

The present disclosure generally relates to computer-implemented games and, in one specific example, to incorporating bad beat insurance into a computer-implemented game to enable a player who is well-positioned to win the game or a portion of a game to receive at least partial compensation if he subsequently loses the game or the portion of the game because of circumstances beyond his control.

BACKGROUND

In some games, a winner of the game may be determined at least partially by luck. For example, in a hand of a Texas Hold 'Em poker card game, a first player may be dealt one of the best possible starting hands (e.g., pocket aces) and a second player may be dealt one of the worst possible starting hands (2-7 off suit). In this scenario, after the hole cards are dealt, the first player may be heavily favored to win the hand. However, despite being heavily favored to win the hand, the first player may end up losing the hand because of circumstances beyond his control. For example, after the remaining cards of the hand are randomly dealt, including the flop, turn, and river cards, the second player may end up with the best five-card Texas Hold 'Em poker hand.

A player who gets unlucky (or suffers a bad beat) while playing a game may lose some enjoyment from playing the game. As a result, the player may become less active with respect to the game. Therefore, an operator of the game may wish to eliminate or diminish negative repercussions that players suffer as a result of getting unlucky while playing the game.

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

In various embodiments, a system and a method of implementing bad beat insurance are disclosed. After a stage of the portion of the game is played, it is determined that the player is favored to win the portion of the game. After the portion of the game is completed, it is determined that the player has suffered a bad beat. The player is compensated at least partially for a loss that the player incurred as a consequence of suffering the bad beat.

Figure 1:
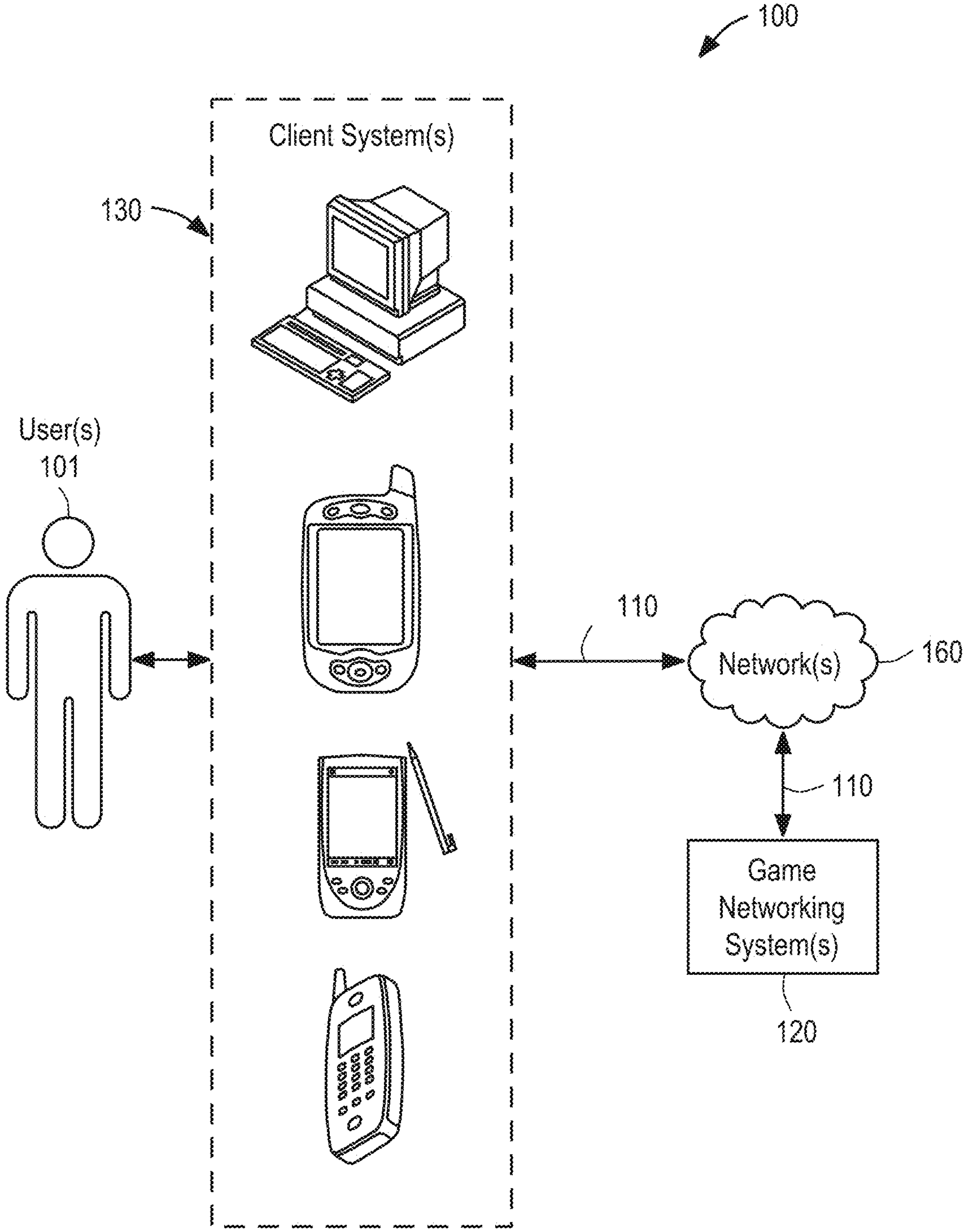
FIG. 1 is a block diagram illustrating an example of a system for implementing various disclosed embodiments.

FIG. 1 is a block diagram illustrating an example of a system 100 for implementing various disclosed embodiments. In particular embodiments, system 100 comprises user(s) 101, game networking system(s) 120, client system(s) 130, and network(s) 160. The one or more users(s) 101 may also be referred to as one or more player(s); and the player(s) may also be referred to as the user(s) 101. The components of system 100 can be connected to each other in any suitable configuration, using any suitable type of connection. The components may be connected directly or over network(s) 160, which may be any suitable network. For example, one or more portions of network(s) 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Game networking system(s) 120 is a network-addressable computing system that can host one or more online games. Game networking system(s) 120 can generate, store, receive, and transmit game-related data, such as, for example, game account data, game input, game state data, and game displays. Game networking system(s) 120 can be accessed by the other components of system 100 either directly or via network(s) 160. Players (e.g., user(s) 101) may use client system(s) 130 to access, send data to, and receive data from game networking system(s) 120. Client system(s) 130 can access game networking system(s) 120 directly, via network 160, or via a third-party system. Client system(s) 130 can be any suitable computing device, such as a personal computer, laptop, cellular phone, smart phone, computing tablet, and the like.

Although FIG. 1 illustrates a particular number of user(s) 101, game networking system(s) 120, client system(s) 130, and network(s) 160, this disclosure contemplates any suitable number of users 101, game networking systems 120, client systems 130, and networks 160. Although FIG. 1 illustrates a particular arrangement of user(s) 101, game networking system(s) 120, client system(s) 130, and network(s) 160, this disclosure contemplates any suitable arrangement of user(s) 101, game networking system(s) 120, client system(s) 130, and network(s) 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between user(s) 101, game networking system(s) 120, client system(s) 130, and network(s) 160, this disclosure contemplates any suitable connections between user(s) 101, game networking system(s) 120, client system(s) 130, and network(s) 160. As an example and not by way of limitation, in particular embodiments, client system(s) 130 may have a direct connection to game networking system(s) 120, thereby bypassing network(s) 160.

Online Games and Game Systems

Game Networking Systems

In an online computer game, a game engine manages the game state of the game. Game state comprises all game play parameters, including player character state, non-player character (NPC) state, in-game object state, game world state (e.g., internal game clocks, game environment), and other game play parameters. Each player (e.g., user 101) controls one or more player characters (PCs). The game engine controls all other aspects of the game, including NPCs and in-game objects. The game engine also manages game state, including player character state for currently active (e.g., online) and inactive (e.g., offline) players.

An online game can be hosted by game networking system(s) 120, which can be accessed using any suitable connection with a suitable client system(s) 130. A player may have a game account on game networking system(s) 120, wherein the game account can contain a variety of information associated with the player (e.g., the player's personal information, financial information, purchase history, player character state, game state, etc.). In some embodiments, a player may play multiple games on game networking system(s) 120, which may maintain a single game account for the player with respect to all the games, or multiple individual game accounts for each game with respect to the player. In some embodiments, game networking system(s) 120 can assign a unique identifier to each user 101 of an online game hosted on game networking system(s) 120. Game networking system(s) 120 can determine that a user 101 is accessing the online game by reading the user's 101 cookies, which may be appended to Hypertext Transfer Protocol (HTTP) requests transmitted by client system(s) 130, and/or by the user 101 logging onto the online game.

In particular embodiments, user(s) 101 may access an online game and control the game's progress via client system(s) 130 (e.g., by inputting commands to the game at the client device). Client system(s) 130 can display the game interface, receive inputs from user(s) 101, transmit user inputs or other events to the game engine, and receive instructions from the game engine. The game engine can be executed on any suitable system (such as, for example, client system(s) 130, or game networking system(s) 120). As an example and not by way of limitation, client system(s) 130 can download client components of an online game, which are executed locally, while a remote game server, such as game networking system(s) 120, provides backend support for the client components and may be responsible for maintaining application data of the game, processing the inputs from the player, updating and/or synchronizing the game state based on the game logic and each input from the player, and transmitting instructions to client system(s) 130. As another example and not by way of limitation, each time a player (e.g., a user 101) provides an input to the game through the client system(s) 130 (such as, for example, by typing on the keyboard or clicking the mouse of client system(s) 130), the client components of the game may transmit the player's input to game networking system(s) 120.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

Game Systems, Social Networks, and Social Graphs

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, user(s) 101 may access particular game instances of an online game. A game instance is a copy of a specific game play area that is created during runtime. In particular embodiments, a game instance is a discrete game play area where one or more user(s) 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more user(s) 101 and one or more in-game objects controlled by the game engine. When accessing an online game, the game engine may allow user(s) 101 to select a particular game instance to play from a plurality of game instances. Alternatively, the game engine may automatically select the game instance that user(s) 101 will access. In particular embodiments, an online game comprises only one game instance that all user(s) 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and another user are directly connected (one edge), they are deemed to be separated by one degree of separation. The other user would be a so-called "first-degree friend" of the player. Where the player and the other user are connected through one other user (two edges), they are deemed to be separated by two degrees of separation. The other user would be a so-called "second-degree friend" of the player. Where the player and the other user are connected through N edges (or N−1 other users), they are deemed to be separated by N degrees of separation. The other user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, game networking system(s) 120). In one embodiment, Nmax equals 1, such that the player's social network includes only first-degree friends. In another embodiment, Nmax is unlimited and the player's social network is coextensive with the social graph.

In particular embodiments, the social graph is managed by game networking system(s) 120, which is managed by the game operator. In other embodiments, the social graph is part of a social networking system managed by a third-party (e.g., Facebook, Friendster, Myspace). In yet other embodiments, user 101 has a social network on both game networking system(s) 120 and a social networking system, wherein user(s) 101 can have a social network on the game networking system(s) 120 that is a subset, superset, or independent of the user's 101 social network on the social networking system. In such combined systems, game networking system(s) 120 can maintain social graph information with edge type attributes that indicate whether a given friend is an "in-game friend," an "out-of-game friend," or both. The various embodiments disclosed herein are operable when the social graph is managed by the social networking system, game networking system(s) 120, or both.

Figure 2:
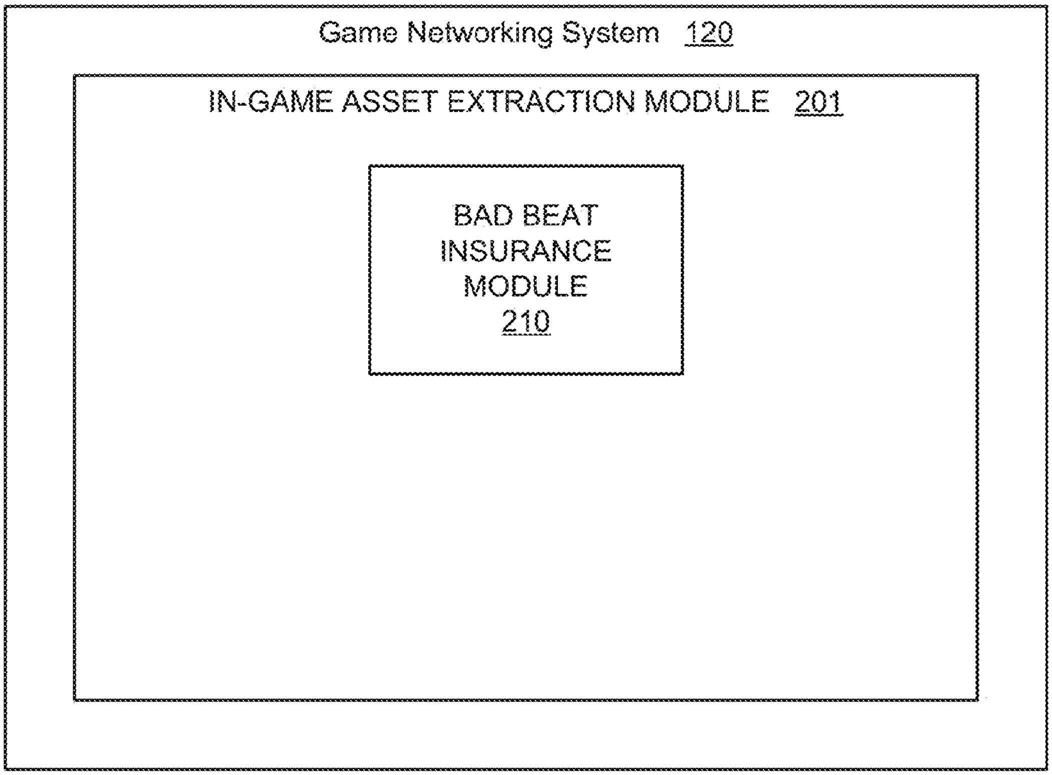
FIG. 2 is a block diagram illustrating an example embodiment of one of the client systems of FIG. 1.

FIG. 2 is a block diagram illustrating an example in-game asset extraction module 201 of the game networking system 120 that is configured to leverage optional features of the game networking system 120 to remove virtual currency from a virtual economy associated with the game networking system 120.

In various embodiments, the game networking system 120 may implement sales of in-game assets to players of one or more computer-implemented games of the game networking system 120. For example, the game networking system 120 may implement one or more modules that enable players of a poker game (e.g., Zynga Poker) executing on the game networking system 120 to purchase poker chips for the poker game.

When a player purchases an in-game asset (e.g., virtual currency), the game networking system 120 may add the in-game asset purchased by the player to a pool of in-game assets in a virtual economy associated with the game networking system 120. In various circumstances, an owner or administrator of the game networking system 120 may wish to reduce the in-game assets in the virtual economy. For example, in order to increase revenues derived from sales of in-game assets, the owner of the game networking system 120 may wish to encourage players of the game to use, consume, spend, or otherwise get rid of their in-game assets more quickly. In other words, the game networking system 120 may determine that if players use up their in-game assets more quickly, they may be more likely to purchase additional in-game assets sooner. Or if the owner of the game networking system 120 offers in-game assets for sale at temporarily reduced prices, which results in a flood of in-game assets coming into the virtual economy, the owner of the game networking system 120 may wish to reduce the in-game assets in the virtual economy to, for example, restore a balance in the virtual economy that existed before the temporary sale of the in-game assets at the reduced rates.

Various modules associated with the game networking system 120 may implement various optional features that may be enabled or disabled with respect to one or more games. Such features may add to the enjoyment of players in playing a game, but may not be required for the players to play the game. For example, a Hand Strength Meter module associated with a card game (e.g., a poker game) may be configured to provide players with information concerning the strength of a given hand in a given situation. The strength of a hand may be defined as the probability that a particular hand at a particular point in a round of the card game will win the round of the card game. For example, the strength of a hand after the hole cards are dealt in a Texas Hold 'Em game may be the probability that the particular two hole cards dealt to a player will ultimately win that round of the game.

Or a Tipping module associated with a card game may enable the player to tip the virtual dealer of a card game with virtual currency, thus simulating the way the player would tip a real dealer at a card game in the real world with real money. The game networking system 120 may add these modules to one or more games of the game networking system 120 based on one or more factors, including a determination that virtual currency should be removed from a virtual economy associated with the one or more games or from a virtual economy associated more generally with the game networking system 120 itself. The modules are described in more detail below.

The game networking system 120 may offer one or more optional (e.g., modularized) features of a game to a player for a fee. This fee may be a real money fee or an in-game asset fee. For example, the game networking system 120 may provide an offer to a player to enable the Hand Strength Meter for a card game for a specific amount of time if the player agrees to pay a specific amount of virtual currency (e.g., chips). In accepting this offer, the player may effectively use his virtual currency to enhance his enjoyment of the game or to receive information that may improve his chances of winning the game or a portion of the game (e.g., a hand of a poker game).

In various embodiments, the game networking system 120 may offer to enable the one or more optional features of the game to the player in exchange for the player agreeing to have winnings or bankrolls of in-game assets associated with his use of the feature being raked (e.g., by a certain percentage of the winnings or another predetermined amount). In accepting this offer, the player may not pay any fee if he does not win additional in-game assets associated with his use of the optional feature. For example, the game networking system 120 may offer the player an option to use the Hand Strength Meter for a particular hand of a poker game in exchange for having any of the player's winnings from the hand raked by 5%. Thus, in this case, if the player wins a pot of 1,000 chips, the game networking system 120 may rake 50 chips from the winnings, awarding the player 9,550 chips and removing 50 chips from the virtual economy. However, if the player loses the hand, the game networking system 120 may not charge the player a fee for using the Hand Strength Meter during the hand. After receiving the player's acceptance of the offer to have winnings raked, the game networking system 120 may implement the rake without additional notifications to the player each time the rake is performed. Alternatively, the game networking system 120 may notify the player when a rake is performed (e.g., via a user interface element).

In various embodiments, the game networking system 120 may enable the player to enable a feature of the game on an ongoing basis in exchange for the player opting in to having a rake applied to all or a certain percentage of future in-game assets won by the player. Thus, the game networking system 120 may apply a rake to 0.5% of pots won, 10% of pots won, 50% of pots won, and so on. The game networking system 120 may select a percentage of winnings to which to apply the rake based on an analysis of adoption rates by players at different percentages (e.g., supply and demand).

In various embodiments, for a card game having blinds, the amount of the rake may be limited to an amount equal to one big blind. In various embodiments, the rake may be removed from the bankroll chips of the player such that the number of chips in play at the table are not affected by the player's decision to opt-in to enabling the feature. In various embodiments, the feature will be disabled if the player does not have enough virtual currency to cover the maximum amount of rake that could be applied to the player's winnings during a stage of the game.

Bad Beat Insurance

The in-game asset extraction module 201 includes a Bad Beat Insurance module 210. The Bad Beat Insurance module 210 is configured to provide a player with insurance against suffering the consequences of a bad beat during a game or a portion of the game. As used herein, a bad beat is when a player suffers an unexpected setback during a game. An example of a bad beat in a Texas Hold 'Em card game is when a player loses a hand that he is favored to win. For example, if a player is dealt pocket aces, the best possible hand in Texas Hold 'Em, his odds of winning the hand (when playing against one other opponent) are approximately 80%. If he loses the hand, he has suffered a bad beat. As another Texas Hold 'Em example, if the player has top pair after the turn card is dealt and his opponent will only win if he makes a flush on the river, the player is favored to win the hand. If his opponent subsequently makes his flush on the river, the player has suffered a bad beat.

The Bad Beat Insurance module may further be configured to determine whether a player has suffered a bad beat based on various criteria. For example, using Texas Hold 'Em as an example, the Bad Beat Insurance module may determine whether the player has suffered a bad beat when the player loses a hand based on the hole cards the player was dealt, the strength of the player's hand versus one or more of his opponents' hands at some point during the dealing of the hand (e.g., after the hole cards are dealt, after the flop, or after the turn), how many chips the player committed to the pot when he was favored to win the hand, or any other criteria pertaining to the player's edge over his opponent during the hand and the consequence of his resulting loss.

Although Texas Hold 'Em is used as an example, one skilled in the art would understand that bad beats may be suffered by a player in any type of game in which the player is favored to win (e.g., by statistical calculation) over his opponents during the playing of the game or a portion of the game and nevertheless loses the game or the portion of the game.

In various embodiments, the Bad Beat Insurance module 210 may enable a player to agree to purchase insurance (e.g., with virtual currency) before the game or the portion of the game to which the insurance would apply. For example, in a Texas Hold 'Em game, the Bad Beat Insurance module 210 may enable a player to insure a hand in a card game before any of the cards have been dealt. Then, if one or more criteria are met, including that the player loses the hand, the player may be provided with a payout to compensate the player at least partially for any loss the player incurs as a consequence of a bad beat. For example, if the player is favored at some point in the hand (e.g., after the hole cards are dealt, after the flop is dealt, or after the turn card is dealt), but the player loses the hand, the player may receive a payout to compensate the player for some or all of the loss he suffers to his opponent. In various embodiments, the Bad Beat Insurance module 210 may determine whether the player has suffered a bad beat based on the odds that the player will win the hand as calculated at a predetermined part of the hand, such as after the turn is dealt. In other embodiments, the Bad Beat Insurance module 210 may determine whether the player has suffered a bad beat based on an aggregation of the edges that the player maintained over his opponents at various points in the hand up until the dealing of the final (river) card. The amount of the insurance payout may be enough to compensate the player for all or a portion of the player's losses suffered as a consequence of the bad beat. In various embodiments, the Bad Beat Insurance module 210 recalculates the insurance payout amount or insurance fee as the game or a portion of the game progresses (e.g., after each card is dealt or after each betting round) based on the player's odds of winning the game or the portion of the game. In various embodiments, the Bad Beat Insurance module 210 may not notify the player of any changes to the calculated insurance payout amount of fee until the payout is provided to the player or the fee is charged to the player.

In exchange for providing the insurance, the Bad Beat Insurance module 210 may charge the player a fee for providing the insurance. In various embodiments, the Bad Beat Insurance module 210 may charge the player a fee (e.g., in chips, gold coins, or other virtual currency) simply for opting-in to receive the bad beat insurance. In other embodiments, the Bad Beat Insurance module 210 may charge the player a fee only if the player opts in to receiving the bad beat insurance during the game or the portion of the game and actually suffers a bad beat during the corresponding game or portion of the game. The Bad Beat Insurance module 210 may calculate the fee based on how favorable the player's odds or chances of winning the portion of the game. For example, if at the point of the portion of the game when the Bad Beat Insurance module 210 provides the insurance, the player's odds of winning the portion of the game are 3 to 1, the Bad Beat Insurance module 210 may enable the player to insure some or all of his virtual currency at risk in the portion of the game at a cost of $1 of virtual currency for every $3 of virtual currency insurance. Or, if the player's odds of winning the portion of the game are 2 to 1, the Bad Beat Insurance module 210 may enable the player to insure some or all of his virtual currency at risk in the portion of the game at a cost of $1 of virtual currency for every $2 of virtual currency insurance.

As an example, assume the turn card has been dealt in a game of heads-up Texas Hold 'Em between a player and his opponent, leaving only the river card left to be dealt in this portion of the game. At this point, eight cards of the 52-card deck have been dealt—two to each player and four to the board (the community cards)—leaving 44 undealt cards. Assume further that at this moment in the portion of the game, the player will win the hand unless his opponent makes a flush. Assume further that there are nine cards of the 44 undealt cards that will result in the player's opponent winning the hand by making the flush. Thus, the odds that the player will win his hand are 35 (undealt cards remaining in the deck that will cause the player to win the hand) to 9 (undealt cards remaining in the deck that will cause the player's opponent to win the hand). Assume further that the player has wagered 1000 of his virtual currency (e.g., chips) that he will win this hand.

In this scenario, the Bad Beat Insurance module 210 may insure some or all of the 1000 chips that the player wagered. In various embodiments, the Bad Beat Insurance module 210 may provide the player with insurance based on the player opting in to receive insurance before the start of the hand. The Bad Beat Insurance module 210 may calculate a fee for providing the insurance. The Bad Beat Insurance module 210 may base the fee on the player's odds of winning the hand. Thus, in this case, given that the player's odds of winning the hand are 35 to 9, the Bad Beat Insurance module 210 may charge the player 9 chips for every 35 chips at risk that the player wishes to insure. Thus, the Bad Beat Insurance module 210 may insure the player's entire 1000 chips for 258 chips (1,000/35*9, rounded up) in virtual currency. Or the Bad Beat Insurance module 210 may charge the player a percentage of this fee based on the percentage of the wager that the player wishes to insure. For example, the Bad Beat Insurance module 210 may insure 500 of the 1000 chips wagered by the player for 129 chips (500/35*9, rounded up) in virtual currency. In other embodiments, the fee may not be based on the player's odds of winning the hand. For example, the fee may be a fixed fee.

In various embodiments, the Bad Beat Insurance module 210 may charge an additional fee (e.g., "juice") for providing the insurance. The amount of the additional fee may be based on a percentage of the amount to be insured. For example, the Bad Beat Insurance module 210 may calculate the fee based on the player's odds of winning the hand plus 5% juice. Thus, in the above example, the Bad Beat Insurance module 210 may charge the player 258 chips plus 50 chips (e.g., 5% of the 1000 chips to be insured). Thus, in various embodiments, if the player wins an insured hand, he will win his chips wagered plus any chips that his opponent wagered minus any fees (e.g., a basic odds-based fee plus a juice fee) that the player paid to insure some or all of his wager. In other words, if the player's opponent matched the player's entire wager of 1000, the player may win his 1000 wager back plus his opponent's 1000 wager minus a total fee of 308 chips. Thus, the player may win 1592 chips (or 308 chips fewer than he would've won if he hadn't taken insurance). On the other hand, if the player loses an insured hand, he will only lose the total fee of 308 chips (or 692 fewer chips than he would've lost if he hadn't taken insurance). Of course, the above calculations do not include any additional chips that may be in the pot, such as blinds and antes.

Although the above example discusses deducting the fee from an in-game asset of the player (e.g., poker chips), one skilled in the art would understand that, in various embodiments, the Bad Beat Insurance module 210 may deduct the fee from any in-game asset of the player (e.g., gold coins, virtual items, or any virtual asset that the player maintains with respect to the game networking system 120). Thus, while the player's wager that is the subject of the insurance may be made using poker chips within a poker tournament, the fee for providing the insurance may be charged to virtual currency that the player possesses with respect to the game networking system 120 (e.g., virtual currency that the player may use to buy additional poker chips), such as chips that the player has not wagered with respect to a particular hand, or chips or virtual currency that a player has in his bankroll with respect to the game or game networking system 120. Thus, the Bad Beat Insurance module 210 may enable a player to insure positions within a sub-game (e.g., a single table tournament of a poker game in which a player plays with chips purchased using virtual currency), as well as a regular game (e.g., a cash game in which the player plays with his actual virtual currency).

In various embodiments, the Bad Beat Insurance module 210 may insure a player's position within a game without charging a fee. For example, the Bad Beat Insurance module 210 may provide insurance for one or more hands of a poker game to a player as an incentive for the player to opt-in to paying a fee for receiving insurance on additional hands of the poker game in the future.

In various embodiments, the Bad Beat Insurance module 210 requires a player to opt-in to receiving insurance for a particular portion of a game (e.g., a hand of a card game) before the portion of the game is played. However, the Bad Beat Insurance module 210 does not actually charge the player a fee for receiving insurance unless a particular scenario within the portion of the game arises. For example, in a Texas Hold 'Em game, the Bad Beat Insurance module 210 may limit the providing of the insurance to scenarios in which the player is dealt a particular starting hand. For example, the Bad Beat Insurance module 210 may not provide insurance unless the player is dealt one of the top starting hands of Texas Hold 'Em, such as the top 5, 10, or 15 hands. Or the Bad Beat Insurance module 210 may not provide insurance unless the player is winning the hand after the turn card is dealt. Thus, in various scenarios, the player may not know whether he is going to receive insurance because he may not know whether he is winning the hand after the turn card is dealt because the player's opponent's cards have not been revealed.

The Bad Beat Insurance module 210 may make a determination about whether to provide the insurance at a particular stage of the portion of the game. For example, the Bad Beat Insurance module 210 may make the determination about whether to provide the insurance after one or more hole cards are dealt or after one or more community cards are dealt. For example, the Bad Beat Insurance Module 210 may make the decision about whether to provide the insurance after the turn card is dealt regardless of whether the player held a winning position within the hand prior to the dealing of the turn card. Or the Bad Beat Insurance Module 210 may make a decision about whether to provide the insurance after the flop is dealt regardless of whether the player held a winning position after the hole cards were dealt and regardless of whether the player holds a winning position after the turn card is dealt.

In various embodiments, the Bad Beat Insurance module 210 may charge a fee to the player when the player opts-in to receiving insurance for a portion of the game regardless of whether a scenario arises during the portion of the game in which the Bad Beat Insurance module 210 determines to provide the insurance.

Figure 3:
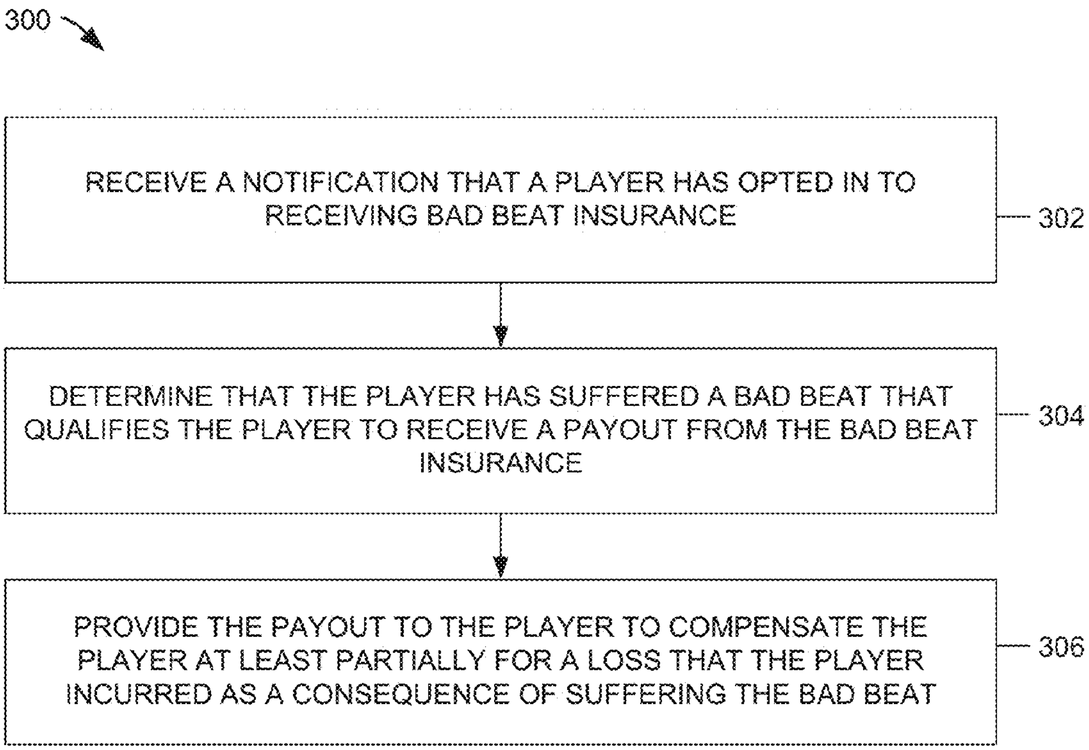
FIG. 3 is a flow chart of an example embodiment of a method of providing bad beat insurance to a player of a game.

FIG. 3 is a flow chart of an example embodiment of a method 300 of providing bad beat insurance to a player of a game. In various embodiments, the method 300 is implemented by the Bad Beat Insurance module 210 of FIG. 2. At operation 302, the Bad Beat Insurance module 210 determines whether the player wishes to receive insurance during a portion of a game. In various embodiments, the Bad Beat Insurance module 210 may charge the player a fee based on the player specifying that he wishes to receive the insurance during the portion of the game. In various embodiments, the Bad Beat Insurance module 210 may not charge the player a fee unless a situation arises during the playing of the game in which the player suffers a type of bad beat that qualifies the player for insurance protection (e.g., as determined by whether one or more criteria are met).

At operation 304, the Bad Beat Insurance module 210 determines whether the player has suffered a bad beat that qualifies the player to receive a payout based on the bad beat insurance. For example, in a Texas Hold 'Em game, the Bad Beat Insurance Module 210 may determine to provide a payout to the player based on the player losing a hand after being dealt one of the top 10 possible hole card combinations in Texas Hold 'Em (e.g., pocket aces). Or the Bad Beat Insurance Module 210 may determine to provide the payout based on the player losing the hand despite being favored to win the hand after the turn card is dealt.

At operation 306, the Bad Beat Insurance module 210 provides the payout to the player. The Bad Beat Insurance module 210 may calculate the amount of the payout to compensate the player at least partially for a loss that the player incurred as a consequence of suffering the bad beat. For example, if the player lost 1000 chips as a result of suffering the bad beat, the Bad Beat Insurance module 210 may provide the player with some or all of the 1000 chips. Or the Bad Beat Insurance module 210 may provide another in-game asset, such as virtual currency or gold coins, to compensate the player for the loss of chips.

Figure 4:
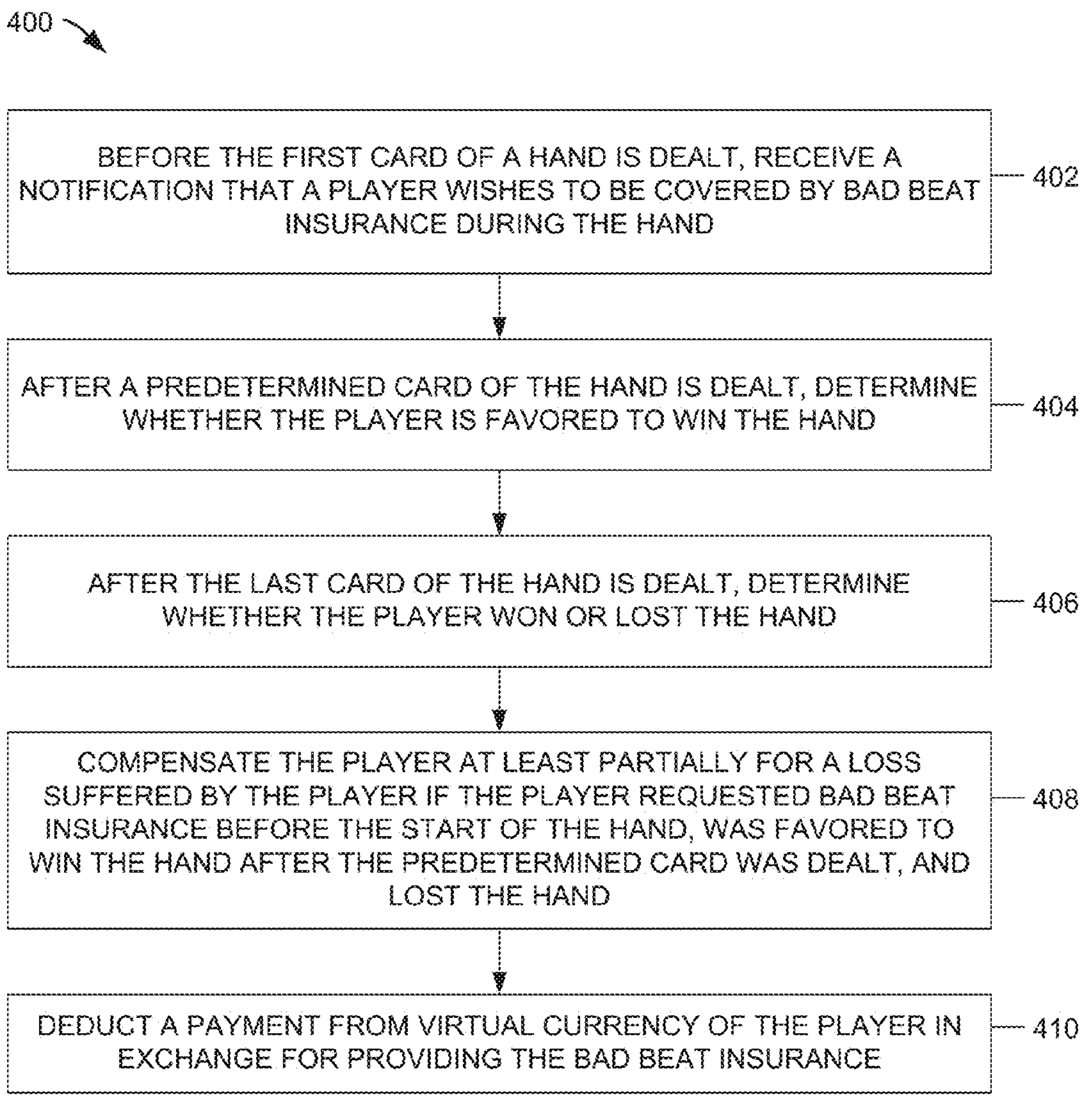
FIG. 4 is a flow chart of an example embodiment of a method of providing bad beat insurance to a player of a card game.

FIG. 4 is a flow chart of an example embodiment of a method 400 of providing bad beat insurance to a player of a card game. In various embodiments, the method 400 is implemented by the Bad Beat Insurance module 210 of FIG. 2. At operation 402, before the first card of a hand of the game is dealt, the Bad Beat Insurance module 210 receives a notification that the player wishes to be covered by bad beat insurance during the hand. At operation 404, after a predetermined card of the hand is dealt (e.g., the turn card in a Texas Hold 'Em card game), the Bad Beat Insurance module 210 determines whether the player is favored to win the hand over one or more opponents. In various embodiments, the predetermined card is selected by the player or an administrator of the game networking system 120. At operation 406, after the last card of the hand is dealt, the Bad Beat Insurance module 210 determines whether the player won or lost the hand. At operation 408, the Bad Beat Insurance module 210 compensates the player at least partially for a loss suffered by the player based on the player requesting bad beat insurance before the start of the hand, being favored to win the hand after a predetermined card was dealt, and losing the hand. At operation 410, the Bad Beat Insurance module 210 deducts a payment from virtual currency of the player in exchange for providing the bad beat insurance. For example, the Bad Beat Insurance module 210 deducts chips from the player's chip stack at the virtual card table on which the card game is being played or deducts virtual currency from an account that the player maintains with respect to the game networking system 120. In this way, the Bad Beat insurance module 210 may remove the amount of the payment from a virtual economy associated with the game networking system 120.

Figure 5:
FIG. 5 is a screenshot of an example user interface for enabling a player of a game to specify that he wishes to receive bad beat insurance.

FIG. 5 is a screenshot of an example user interface 500 for enabling a player of a game to specify that he wishes to receive bad beat insurance. In various embodiments, the Bad Beat Insurance module 210 (FIG. 2) presents the user interface 500 to the user while he is playing a game. The user interface 500 includes a selectable user interface element (e.g., an umbrella icon). By selecting the selectable user interface element, the player specifies that he is opting in to receive bad beat insurance for eligible hands that he plays in the future. By deselecting the selectable user interface element, the player specifies that he is opting out of receiving bad beat insurance for eligible hands that he plays in the future. In various embodiments, the Bad Beat Insurance module 210 may consider the request by the player to opt in or opt out of receiving bad beat insurance for future hands that are played by the player, but not the hand that is currently being played by the player.

Thus, the Bad Beat Insurance module 210 may not only reduce the amount of virtual currency in a virtual economy associated with the game networking system 120, but also provide players with a more enjoyable gaming experience. In particular, because players have the option to protect themselves from bad beats, they may increase their participation within the game.

Data Flow

Figure 6:
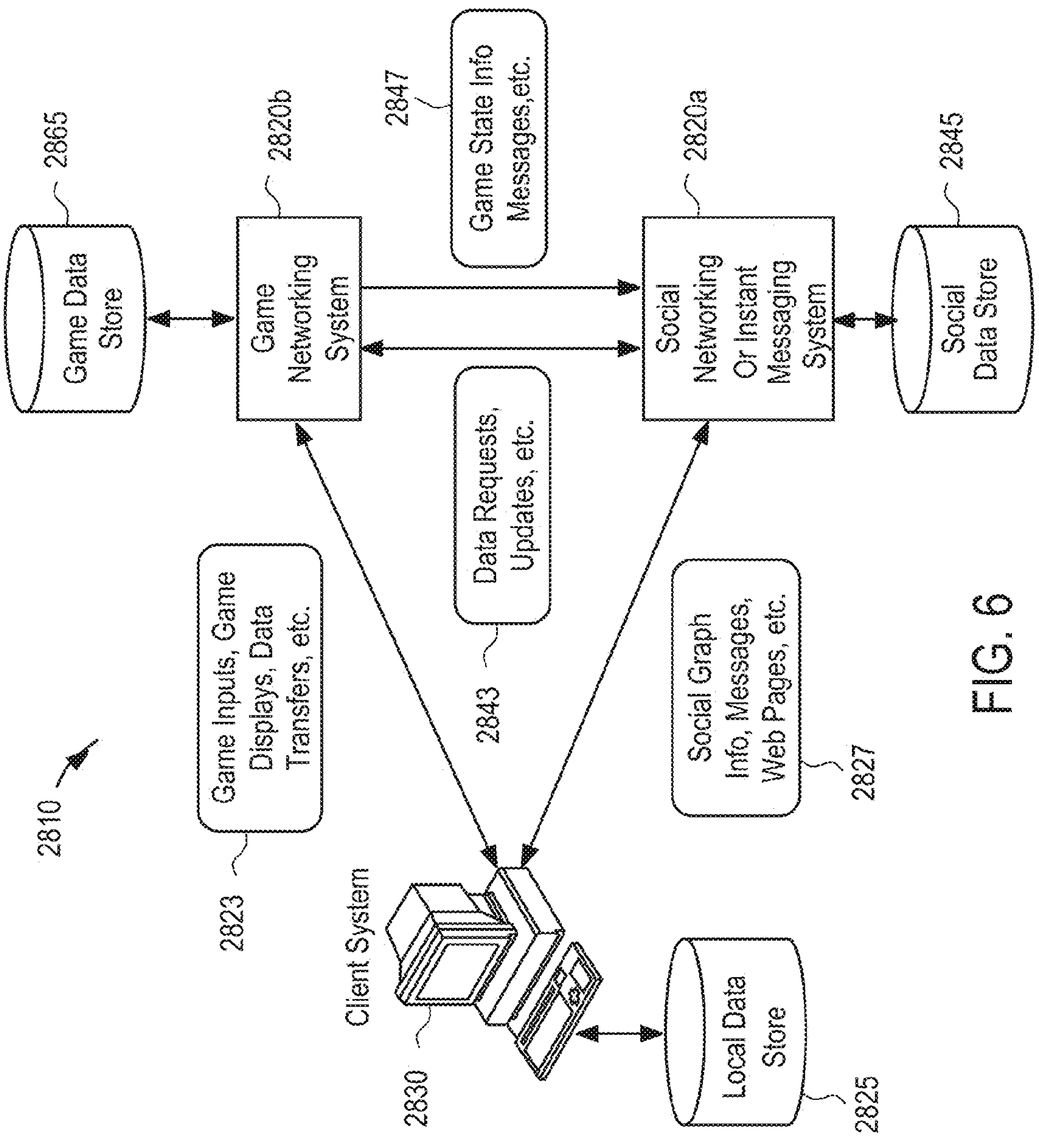
FIG. 6 is a block diagram illustrating an example data flow between the components of a system.

FIG. 6 is a block diagram illustrating an example data flow between the components of system 2810. In particular embodiments, system 2810 can include client system 2830, social networking system 2820*a*, and game networking system 2820*b*. The components of system 2810 can be connected to each other in any suitable configuration, using any suitable type of connection. The components may be connected directly or over any suitable network. Client system 2830, social networking system 2820*a*, and game networking system 2820*b* can each have one or more corresponding data stores such as local data store 2825, social data store 2845, and game data store 2865, respectively. Social networking system 2820*a* and game networking system 2820*b* can also have one or more servers that can communicate with client system 2830 over an appropriate network. Social networking system 2820*a* and game networking system 2820*b* can have, for example, one or more internet servers for communicating with client system 2830 via the Internet. Similarly, social networking system 2820*a* and game networking system 2820*b* can have one or more mobile servers for communicating with client system 2830 via a mobile network (e.g., GSM, PCS, Wi-Fi, WPAN, etc.). In some embodiments, one server may be able to communicate with client system 2830 over both the Internet and a mobile network. In other embodiments, separate servers can be used.

Client system 2830 can receive and transmit data 2823 to and from game networking system 2820*b*. This data can include, for example, webpages, messages, game inputs, game displays, HTTP packets, data requests, transaction information, updates, and other suitable data. At some other time, or at the same time, game networking system 2820*b* can communicate data 2843, 2847 (e.g., game state information, game system account information, page info, messages, data requests, updates, etc.) with other networking systems, such as social networking system 2820*a* (e.g., Facebook, Myspace, etc.). Client system 2830 can also receive and transmit data 2827 to and from social networking system 2820*a*. This data can include, for example, webpages, messages, social graph information, social network displays, HTTP packets, data requests, transaction information, updates, and other suitable data.

Communication between client system 2830, social networking system 2820*a*, and game networking system 2820*b* can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols may be used). In addition, a server in one interaction context may be a client in another interaction context. In particular embodiments, the information transmitted between hosts may be formatted as HTML documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820*b*, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820*b*. Game networking system 2820*b* may itself operate by retrieving a copy of the BLOB from a database or an intermediate memory cache (memcache) layer. Game networking system 2820*b* can also de-serialize the BLOB to resolve the game state parameters and execute its own game logic based on the events in the batch file of events transmitted by the client to synchronize the game state on the server side. Game networking system 2820*b* may then re-serialize the game state, now modified, into a BLOB and pass this to a memory cache layer for lazy updates to a persistent database.

With a client-server environment in which the online games may run, one server system, such as game networking system 2820*b*, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820*b* for further processing. In addition, multiple client systems 2830 may transmit other types of application data to game networking system 2820*b*.

In particular embodiments, a computer-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 2830, either caused by an action of a game player or by the game logic itself, client system 2830 may need to inform game networking system 2820*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multi-player online game hosted on a network-addressable system (such as, for example, social networking system 2820*a* or game networking system 2820*b*), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 2820*a* or game networking system 2820*b*). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 2830, the Flash client may send the events that caused the game state changes to the in-game object to game networking system 2820*b*. However, to expedite the processing and hence the speed of the overall gaming experience, the Flash client may collect a batch of some number of events or updates into a batch file. The number of events or updates may be determined by the Flash client dynamically or determined by game networking system 2820*b* based on server loads or other factors. For example, client system 2830 may send a batch file to game networking system 2820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820*b* may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 2820*b* may retrieve the corresponding BLOB from the database to determine the most-recent values of the game-related data. In particular embodiments, while a player is playing the online game, game networking system 2820*b* may also load the corresponding BLOB into a memory cache so that the game networking system 120 may have faster access to the BLOB and the game-related data contained therein.

Systems and Methods

In particular embodiments, one or more described webpages may be associated with a networking system or networking service. However, alternate embodiments may have application to the retrieval and rendering of structured documents hosted by any type of network-addressable resource or web site. Additionally, as used herein, a user may be an individual, a group, or an entity (such as a business or third-party application).

Figure 7:
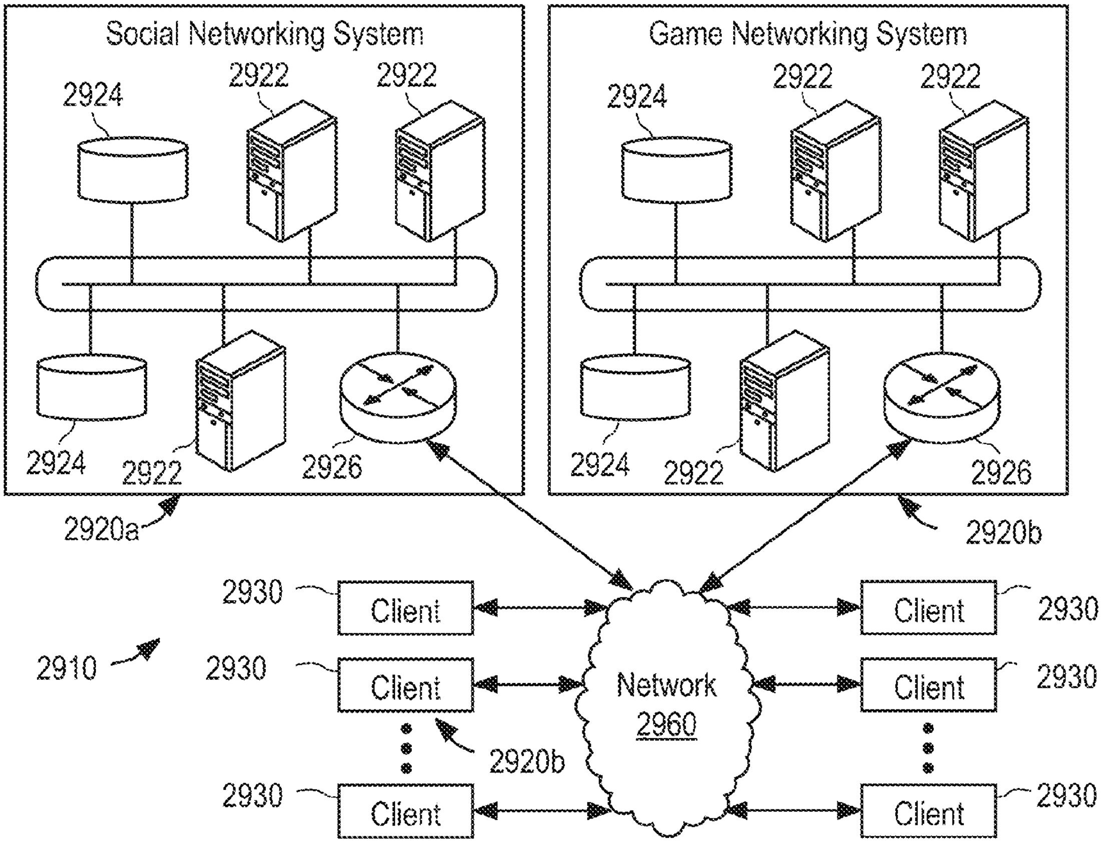
FIG. 7 is a block diagram illustrating an example network environment in which various example embodiments may operate.

Particular embodiments may operate in a wide area network environment, such as the Internet, including multiple network-addressable systems. FIG. 7 is a block diagram illustrating an example network environment 2910, in which various example embodiments may operate. Network cloud 2960 generally represents one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 7 illustrates, particular embodiments may operate in a network environment comprising one or more networking systems, such as social networking system 2920*a*, game networking system 2920*b*, and one or more client systems 2930. The components of social networking system 2920*a* and game networking system 2920*b* operate analogously; as such, hereinafter they may be referred to simply as networking system 2920. Client systems 2930 are operably connected to the network environment 2910 via a network service provider, a wireless carrier, or any other suitable means.

Networking system 2920 is a network-addressable system that, in various example embodiments, comprises one or more physical servers 2922 and data stores 2924. The one or more physical servers 2922 are operably connected to computer network 2960 via, by way of example, a set of routers and/or networking switches 2926. In an example embodiment, the functionality hosted by the one or more physical servers 2922 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2924 corresponds to one or more of a variety of separate and integrated databases, such as relational databases and object-oriented databases, that maintain information as an integrated collection of logically related records or files stored on one or more physical systems. Structurally, data store 2924 may generally include one or more of a large class of data storage and management systems. In particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is generally a computer or computing device including functionality for communicating (e.g., remotely) over a computer network. Client system 2930 may be a desktop computer, laptop computer, personal digital assistant (PDA), in- or out-of-car navigation system, smart phone or other cellular or mobile phone, or mobile gaming device, among other suitable computing devices. Client system 2930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier (ID), as well as information identifying or characterizing the web browser or operating system running on the user's client system 2930. The request may also include location information identifying a geographic location of the user's client system or a logical network location of the user's client system. The request may also include a timestamp identifying when the request was transmitted.

Although the example network environment 2910 described above and illustrated in FIG. 7 is described with respect to social networking system 2920*a* and game networking system 2920*b*, this disclosure encompasses any suitable network environment using any suitable systems. As an example and not by way of limitation, the network environment may include online media systems, online reviewing systems, online search engines, online advertising systems, or any combination of two or more such systems.

Figure 8:
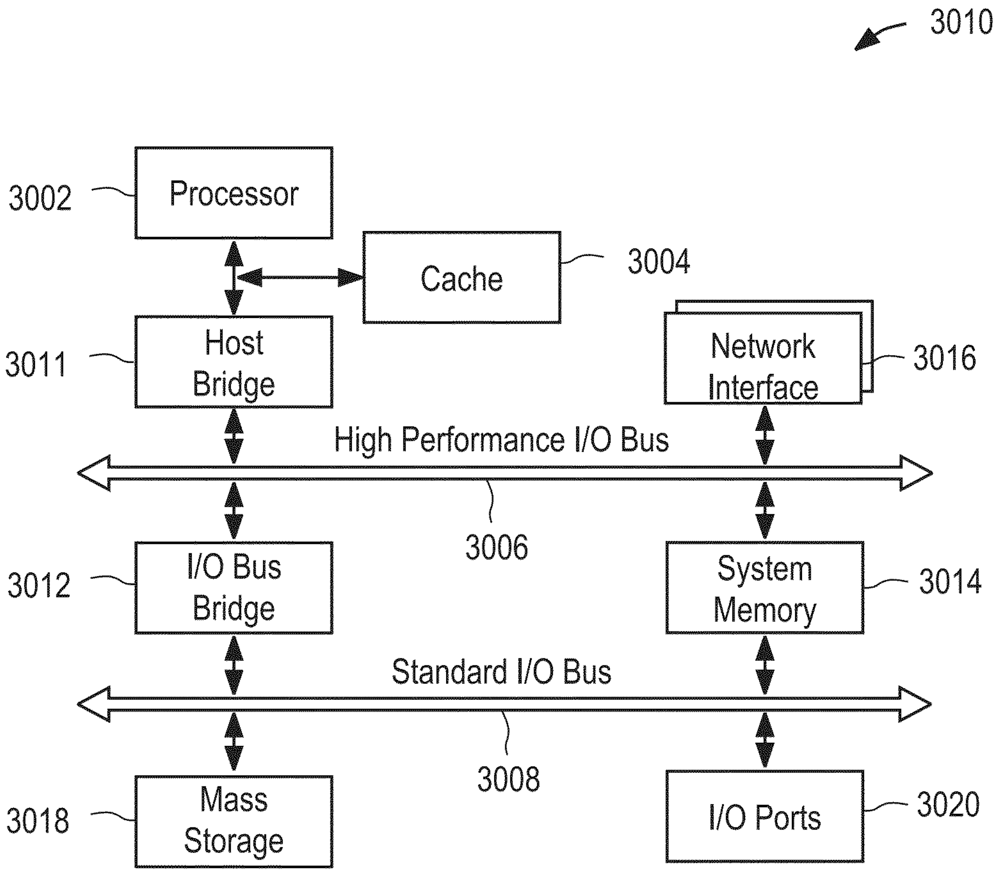
FIG. 8 is a block diagram illustrating an example computing system architecture that may be used to implement a server or a client system.

FIG. 8 is a block diagram illustrating an example computing system architecture, which may be used to implement a server 2922 or a client system 2930 (FIG. 7). In one embodiment, hardware system 3010 comprises a processor 3002, a cache memory 3004, and one or more executable modules and drivers, stored on a tangible computer-readable medium, directed to the functions or methodologies described herein. Additionally, hardware system 3010 may include a high performance input/output (I/O) bus 3006 and a standard I/O bus 3008. A host bridge 3011 may couple processor 3002 to high performance I/O bus 3006, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 (e.g., DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures, and various components of hardware system 3010 may be rearranged. For example, cache memory 3004 may be on-chip with processor 3002. Alternatively, cache memory 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the disclosure.

A recitation of "a", "an," or "the" is intended to mean "one or more" unless specifically indicated to the contrary.

In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a poker game, the embodiments can be applied to any game that includes multiple players. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A method comprising:

automatically controlling whether a graphical representation of a strength of a hand of a player is presented in a user interface of an online card game during a round of an online card game, the automatic adjusting including:

detecting that a card has been dealt to a player in the round of the online card game; and based on the player opting in to the presenting of the graphical representation in exchange for a fee:

identifying a strength of a hand of the player, the hand including the card, the identifying based on a probability that the hand will win the round of the card game; and generating the graphical representation of the strength of the hand for presentation in the user interface of the online card game to assist the player in selecting an action to perform during the round, wherein one or more modules are incorporated into an online game system to specially configure one or more computer processors of the online game system to perform the controlling of the graphical representation in the user interface.

2. The method of claim 1, wherein the graphical representation includes a gauge that represents the strength of the hand relative to all possible hands during the round.

3. The method of claim 1, further comprising presenting the graphical representation in the user interface in proximity to a control pertaining to the selecting of the action.

4. The method of claim 1, further comprising generating a graphical indicator of whether a strength of an additional hand of the player will be identified for the player in a next round of the online card game.

5. The method of claim 4, wherein the graphical indicator comprises a control that it is activatable by the player to renew an authorization from the player to charge an account of the player an additional fee in exchange for the generating the additional the graphical representation of the strength of the additional hand of the player.

6. The method of claim 1, wherein the graphical representation further includes a textual description that identifies the hand.

7. A system comprising:

one or more modules incorporated into game networking system to specially configure one or more computer processors of the game networking system to, at least:

automatically control whether a graphical representation of a strength of a hand of a player is presented in a user interface of an online card game during a round of an online card game, the automatic adjusting including:

detecting that a card has been dealt to a player in the round of the online card game, and;

based on the player opting in to the presenting of the graphical representation in exchange for a fee:

identifying a strength of a hand of the player, the hand including the card, the identifying based on a probability that the hand will win the round of the card game; and generating the graphical representation of the strength of the hand for presentation in the user interface of the online card game to assist the player in selecting an action to perform during the round.

8. The system of claim 7, wherein the graphical representation includes a gauge that represents the strength of the hand relative to all possible hands during the round.

9. The system of claim 7, wherein the one or more modules further configure the online game system to present the graphical representation in the user interface in proximity to a control pertaining to the selecting of the action.

10. The system of claim 7, wherein the one or more modules further configure the online game system to generate a graphical indicator of whether a strength of an additional hand of the player will be identified for the player in a next round of the online card game.

11. The system of claim 10, wherein the graphical indicator comprises a control that it is activatable by the player to renew an authorization from the player to charge an account of the player in exchange for the generating the additional visual representation of the strength of the additional hand of the player.

12. The system of claim 7, wherein the graphical representation further includes a textual description that identifies the hand.

13. A computer readable medium, the computer readable medium not including a transitory propagating signal, the computer readable medium embodying a set of instructions that, when executed by one or more processors, cause the one or more processors to perform operations, the operations comprising:

automatically controlling whether a graphical representation of a strength of a hand of a player is presented in a user interface of an online card game during a round of an online card game, the automatic adjusting including:

detecting that a card has been dealt to a player in the round of the online card game; and based on the player opting in to the presenting of the graphical representation in exchange for a fee:

identifying a strength of a hand of the player, the hand including the card, the identifying based on a probability that the hand will win the round of the card game; and generating the graphical representation of the strength of the hand for presentation in the user interface of the online card game to assist the player in selecting an action to perform during the round.

14. The computer readable medium of claim 13, wherein the graphical representation includes a gauge that represents the strength of the hand relative to all possible hands during the round.

15. The computer readable medium of claim 13, further comprising presenting the graphical representation in the user interface in proximity to a control pertaining to the selecting of the action.

16. The computer readable medium of claim 13, further comprising generating a graphical indicator of whether a strength of an additional hand of the player will be identified for the player in a next round of the online card game.

17. The computer readable medium of claim 16, wherein the graphical indicator comprises a control that it is activatable by the player to renew an authorization from the player to charge an account of the player in exchange for the generating the additional graphical representation of the strength of the additional hand of the player.

* * * * *